Jan. 22, 1946. W. CUNNINGHAM 2,393,311
PARACHUTE HARNESS AND QUICK RELEASE FASTENING MEANS
Filed Nov. 28, 1944 4 Sheets-Sheet 4
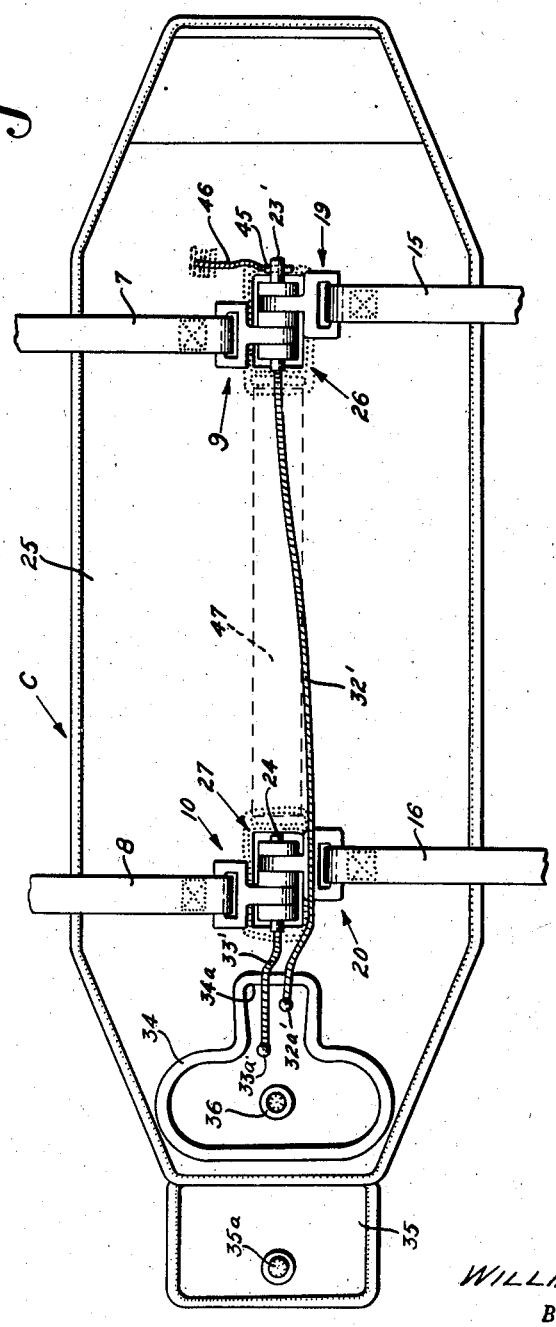
INVENTOR.
WILLIAM CUNNINGHAM
BY
ATTORNEYS Patented Jan. 22, 1946

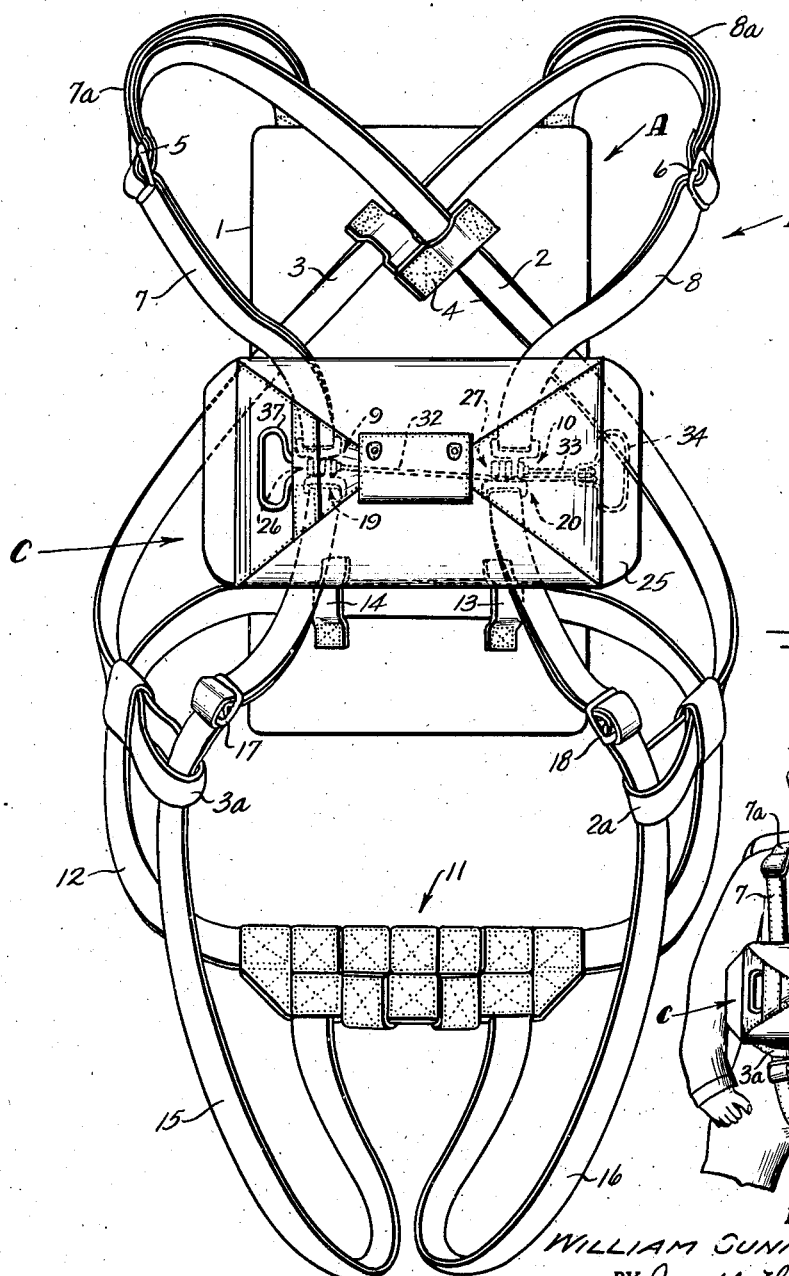

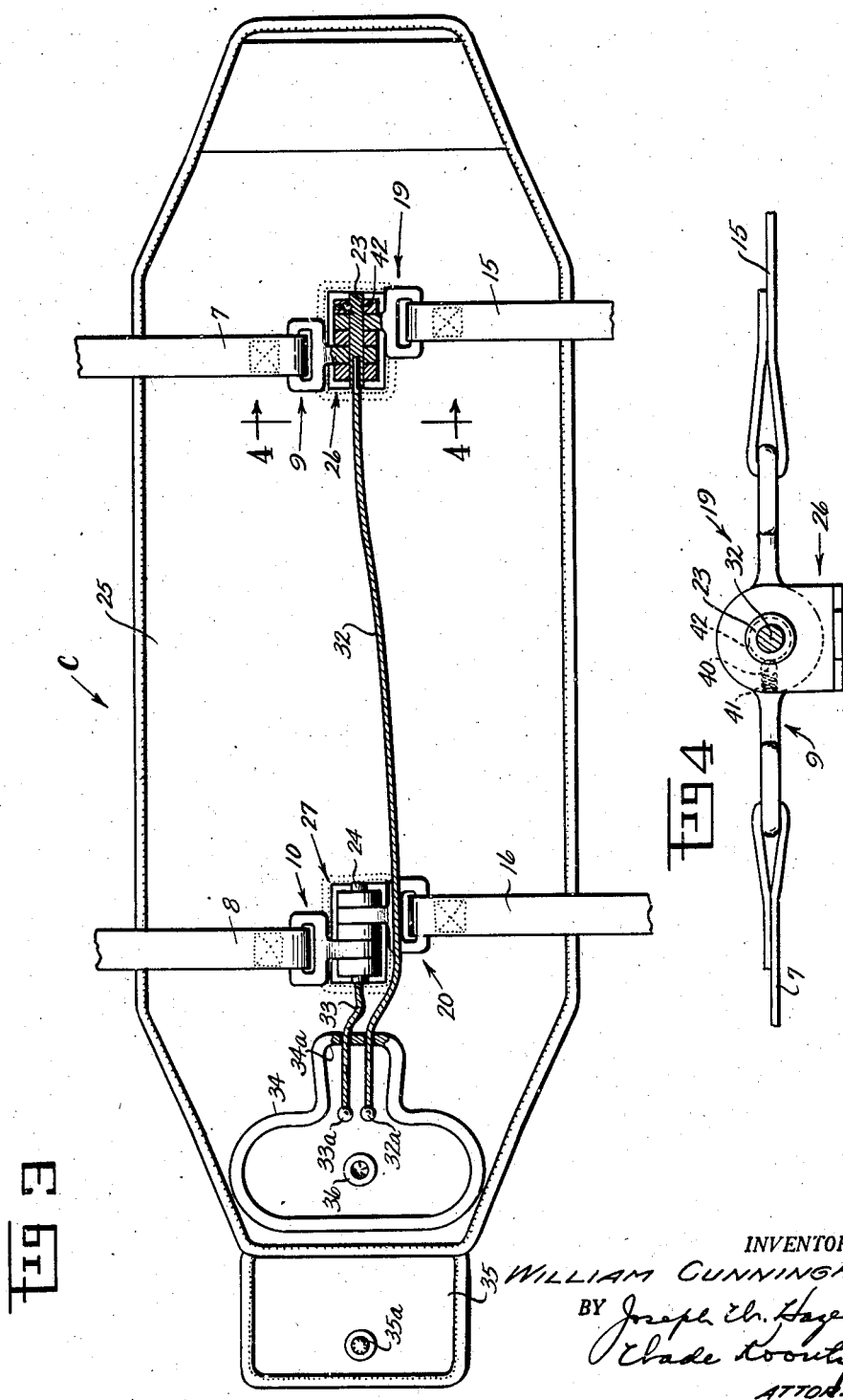

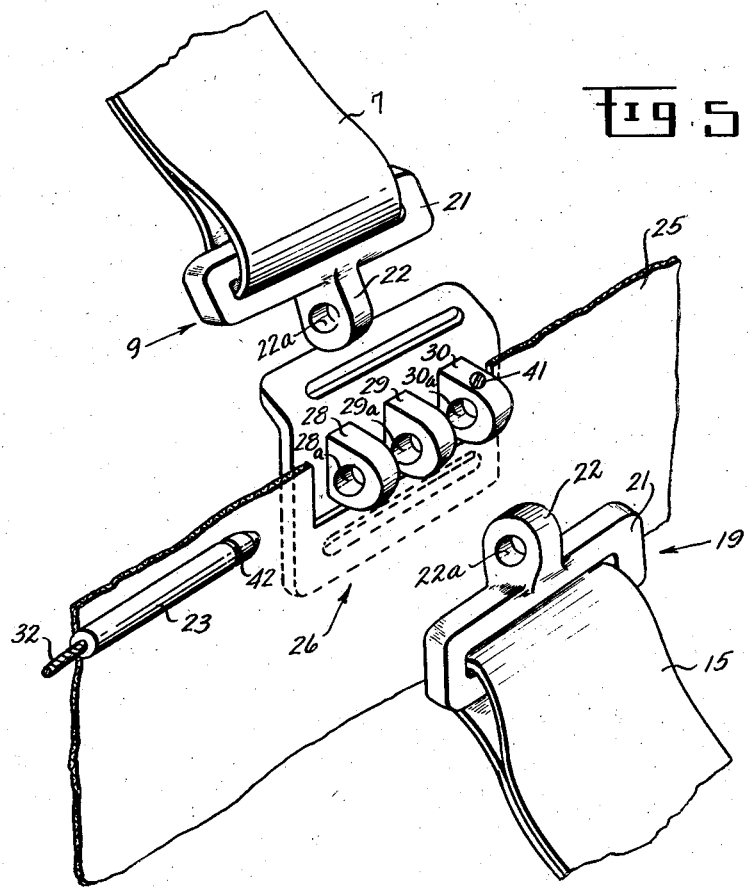

2,393,311

UNITED STATES PATENT OFFICE 2,393,311

PARACHUTE HARNESS AND QUICK RELEASE FASTENING MEANS

William Cunningham, Fort Benning, Ga.

Application November 28, 1944, Serial No. 565,565

17 Claims. (Cl. 244—151)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to parachute apparatus, and more particularly, to the provision of an improved parachute harness in conjunction with a reserve parachute pack and quick release fastening means for releasably securing the reserve parachute pack to the harness.

Parachute harness of the type referred to usually comprises strap means adapted to be disposed around the body of a parachutist. The parachute is connected to the harness and initially maintained in a folded condition by means of an envelope encompassing the parachute and separately secured to the harness. The free ends of the harness strap means are provided with fastening means for securing the harness in proper position disposed around the body of the wearer.

One of the problems involved in the design of parachute harness is to provide fastening means which will not only positively maintain the harness secured in proper position upon the body of the wearer, but which may be quickly released when the parachutist has descended to the earth so that he may readily free himself from the harness and the parachute connected thereto. Unless the parachutist is able to release himself quickly from the parachute harness and the parachute attached thereto, upon descent to earth, he is subject to risk of injury resulting from his being dragged over the ground by the action of high winds upon the still extended parachute canopy; or if he has come down over water, he risks drowning before he can disengage himself from the parachute harness. In combat operations particularly, it is highly desirable that the parachutist be enabled to disengage himself quickly from the parachute apparatus upon descent to the ground so that he can move rapidly into battle operations and avoid becoming a casualty as a result of enemy action occurring during the time required for the parachutist to release himself from the harness after reaching the ground.

Many designs of parachute harness and quick release fastening means have been heretofore proposed and used in the art, and are largely successful where the design contemplates the connection of but a single parachute to the harness. Certain of the previous designs of parachute harness and quick release fastening means are of the so-called single point release type whereby the free ends of the harness straps are all brought together in adjacent relation, usually at a point in front of the chest of the wearer, and secured by suitable fastening elements to a so-called quick release device. However, in connection with the design of combat type parachute apparatus for airborne troops in modern warfare, it has been the experience of United States Army Air Forces that it is desirable to provide a reserve parachute in addition to the main parachute that is opened automatically by the static line connected to the parachute and to the airplane when the parachutist jumps therefrom, the reserve parachute being releasable from its pack under control of the parachutist in the event of failure of the main parachute.

The provision of a reserve parachute complicates the problem of design of the parachute harness with reference to the provision of satisfactory quick release fastening means, since the attachment of the reserve parachute to the harness is likely either to interfere with the operation of the quick release fastening means of the type heretofore provided, or to make it necessary to first release the reserve parachute in order to get it out of the way before the so-called quick release means can be operated to free the harness itself from the wearer's body.

It is therefore an object of the present invention to provide an arrangement of parachute harness in conjunction with a parachute pack, wherein quick release fastening means are employed for connecting the envelope element of the parachute pack to the harness.

Another object of the invention is to provide an arrangement of parachute harness in conjunction with a parachute pack, and means for releasably connecting the harness to said parachute pack whereby the interconnection serves to maintain the harness disposed in proper position around the body of the wearer, and release of said connection permits the parachutist to free himself readily from the harness and the other parachute apparatus associated therewith without the necessity of performing a plurality of unfastening operations.

Another object of the invention is to provide an arrangement of parachute harness in conjunction with a reserve parachute pack and quick release fastening means for connecting the harness to said reserve parachute pack whereby the interconnection serves to maintain the harness disposed in proper position around the body of the wearer, and release of said connection may be effected by a single manual operation, permitting the parachutist to quickly disengage himself from the parachute apparatus.

Another object of the invention is to provide an arrangement of parachute harness in conjunction with a parachute pack, and means for releasably connecting the harness to said pack whereby the interconnection serves to maintain the harness disposed in proper position around the body of the wearer, and release of said connection serves to disconnect the parachute pack from the harness and free the ends of the latter so that the parachutist may quickly disengage himself therefrom.

Another object of the invention is to provide an arrangement of parachute harness in conjunction with a reserve parachute pack and means for relesably connecting the parachute pack to the harness requiring but slight modification of the standard forms of parachute harness now in use.

Another object of the invention is to provide quick release fastening means for the accomplishment of the objectives aforesaid which is simple in construction, positive in action, and safe in operation.

Another object of the invention is to provide fastening means for connecting a parachute pack to the harness in which the fastening means comprises spaced sets of mutually cooperable connecting elements and common means for simultaneously releasing all of said sets of connecting elements from cooperative fastening relation.

The parachute apparatus of the invention, as disclosed herein, involves the provision of a harness comprising a pair of shoulder straps and a pair of leg straps adapted to be disposed around the body of a parachutist and said straps each having a respective fastening element secured to its free end. One feature of the invention involves the provision of an envelope adapted to contain a parachute, said envelope having a pair of fastening elements secured in spaced relation thereto, and coupling means comprising a pair of coupling members, each of said coupling members being cooperable with a respective fastening element on the envelope and with the fastening elements of one shoulder strap and one leg strap for connecting said elements together, a respective actuating member for each coupling member, and operating means common to said actuating members for simultaneously releasing said coupling members from cooperative relation with said elements.

Another feature of the invention involves the provision of yieldable detent means operable to resist release of one or both of the coupling members from cooperative relation with the fastening elements.

Another feature of the invention involves the provision of positive locking means cooperable with one of the coupling members and the provision of an actuating member for the other coupling member arranged so as to be non-operable by the common operating means until said locking means is released from locked condition.

Another feature of the invention involves the provision of means interconnecting the fastening elements on the parachute envelope whereby to prevent said elements from spreading and tearing said envelope.

Other objects, advantages and features of the invention will become apparent from the following detailed description taken in conjunction with the accompanying drawings in which:

Fig. 1 is a perspective view of a parachute harness and associated parachute packs in their arrangement as worn by the aviator and illustrating the invention.

Fig. 2 is a view showing the parachute apparatus disposed in position upon a parachutist.

Fig. 3 is a rear view of the reserve parachute pack showing the quick release fastening means of the invention and the manner of its association with the harness and the reserve parachute pack.

Fig. 4 is a detail view of the quick release fastening means taken about on the line 4—4 of Fig. 3, looking in the direction of the arrows.

Fig. 5 is a perspective view of certain of the fastening elements forming a part of the quick release fastening means.

Fig. 6 is a rear view similar to Fig. 3 of the reserve parachute pack illustrating a modification of the invention in respect to the provision of positive locking means and the arrangement, in respect to the common operating means, of the actuating means for the coupling members.

Now, referring to Figs. 1 to 5, and describing the invention in detail, there is illustrated in Figs. 1 and 2 a parachute apparatus very similar to a standard type now in use except as to features more particularly described hereinafter. The parachute apparatus of Figs. 1 and 2 includes a back type parachute pack generally indicated by the letter A, which is associated with a harness generally indicated by the letter B. Also associated with the harness B, and adapted to be positioned at the front of the parachutist, is a reserve parachute pack generally indicated by the letter C. The back type parachute pack A comprises an envelope 1 within which the main parachute (not shown) is maintained in folded condition.

The parachute harness B comprises strap means including back straps 2 and 3 which are associated with the main parachute envelope 1 by means of webbing 4 stitched to said envelope 1 and under which the back straps 2 and 3 are passed loosely for adjustability of these straps with respect to the envelope 1 while supporting the same upon the harness. As shown in Fig. 1, the back straps 2 and 3 are disposed in crossed relation and are brought over the shoulders of the wearer and respectively connected to adapters 5 and 6. Straps 7 and 8 are each threaded through a respective one of the adapters 5 and 6 and their lower ends are provided with fastening elements 9 and 10, respectively. The upper ends 7a and 8a of the straps 7 and 8 form lift webs which are connected to the main parachute adapted to be contained in the envelope 1. The strap portions 7a and 8a therefore extend into the envelope 1 when the main parachute is in packed condition inclosed within the envelope 1.

The harness further comprises a seat portion 11 carried by a strap 12 associated with the envelope 1 in slip relation thereto by means of webs 13 and 14 stitched to the envelope 1 and under which the strap 12 loosely passes. Extending from the seat portion 11 are leg straps 15 and 16 which are adapted to extend upwardly through loop portions 2a and 3a provided at the lower ends of the back straps 2 and 3 respectively for adjusting the length of the leg straps. The upper ends of the leg straps 15 and 16 have fastening elements 19 and 20, respectively, secured thereto.

The general arrangement of the harness as thus far described, is largely of a standard form in respect of the provision of back straps, lift webs, seat portion, and leg straps; and the manner of association of the harness with the main parachute pack A. The parachute apparatus of the present invention differs from standard types principally in the manner of association of the harness with the reserve pack C and in the fastening means provided for this purpose.

In accordance with the present invention, the free ends of the harness A are adapted to be connected to the reserve parachute pack C in such a manner that when the harness is disposed around the wearer's body the connection of the free ends of said harness to the reserve pack serves to maintain the harness in proper position disposed around the wearer's body and also serves to maintain the respective main and reserve parachute packs in proper position upon the wearer's body and in the desired condition of association with the harness; and the manner of the connection of the harness with the reserve parachute pack is such that, upon release of said connection, the reserve pack is disconnected from the harness and the ends of the harness are simultaneously released from interconnected condition so that the harness falls loose, permitting the parachutist to readily disengage himself therefrom. The present invention further contemplates that the connection of the harness to the reserve parachute pack shall be effected by quick release fastening means releasable by a simple maneuver comprising the manipulation of a conveniently located control means.

To the foregoing ends the fastening elements 9, 10, 19 and 20 each comprise a rectangular ring portion 21 (see Fig. 5) provided with a lug or eye member 22 having an eye or aperture 22a therethrough through which one of the coupling pin members 23 or 24 is adapted to be inserted.

The reserve parachute pack C includes an envelope 25 having a reserve parachute (not shown) connected thereto and adapted to be maintained in folded condition inclosed in said envelope 25. Fastening means is provided on the envelope 25 for cooperation with the fastening elements 9, 10, 19 and 20 secured to the free ends of respective harness strap members. The fastening means on the envelope 25 comprises a pair of fastening elements generally designated by the numerals 26 and 27 secured to the envelope 25 in spaced relation to one another. Each of the fastening elements 26 and 27 comprises a plurality of spaced, integrally related, lugs or eye members, 28, 29 and 30, extending from the rear side of envelope 25 (that is, the side of envelope 25 which is toward the wearer), said lug members 28, 29 and 30 each being provided with respective aligned or registering eyes or apertures 28a, 29a and 30a therethrough for the insertion of a respective one of the coupling pin members 23 or 24 therethrough.

The eye member 22 of the upper body strap fastening element 9 is adapted to be disposed between the eye elements 28, 29 of the fastening element 26 with the aperture 22a in registry with the apertures 28a, 29a and 30a; and similarly, the eye element 22 of the fastening element 19 is adapted to be disposed between the eye elements 29 and 30 of fastening element 26 with its aperture 22a in line with the apertures 28a, 29a and 30a. Likewise, the fastening elements 10 and 20 are similarly disposed with respect to fastening element 27. Thus the fastening element 26 of the reserve parachute envelope 25 is adapted to cooperate with the fastening elements 9 and 19 on the upper body strap 7 and the lower body strap 15 respectively, and the pin element 23 inserted through the apertures in the respective fastening elements 9, 19 and 26, whereby to connect straps 7 and 15 to the envelope 25 of the reserve parachute C. Similarly, the fastening element 27 on the reserve parachute envelope 25 is designed to cooperate with the fastening elements 10 and 20 secured respectively to the upper and lower body straps 8 and 16 and the pin member 24 inserted through the apertures in said fastening elements whereby to secure the free ends of the upper and lower body straps 8 and 16 respectively to the reserve parachute envelope 25.

The pin members 23 and 24 are associated with respective actuating members, which in turn, are associated with a common control member whereby withdrawal of the pins 23 and 24 from coupling connection with the fastening elements 9, 19, 26 and 10, 20, 27 will be effected simultaneously. These actuating members comprise a flexible cable 32 secured in any suitable manner to the coupling pin member 23 and a flexible cable 33 secured to the coupling member 24. The other ends of the cables 32 and 33 extend loosely through respective openings provided in a handle member 34 and said cables 32 and 33 are respectively provided with abutments 32a and 33a which are adapted to engage the portion 34a of the handle member 34 when the latter is pulled leftwardly, having reference to Fig. 3 (or rightwardly, having reference to Fig. 1). The actuating members or cables 32 and 33 are of such a length that the portion 34a of the handle member 34 will engage the abutments 32a and 33a simultaneously when the handle member 34 is moved leftwardly, having reference to Fig. 3, whereby further movement of the handle member 34 in a leftward direction, having reference to Fig. 3, will cause simultaneous withdrawal of the coupling pins 23 and 24 from coupling engagement with the fastening elements 9, 19, 26 and 10, 20, 27 to release the harness from connection with the envelope 25 of the reserve parachute pack C.

The handle 34 is designed to be retained normally in the position shown in Fig. 3. For this purpose the envelope 25 is provided with a flap member 35 having a snap fastener element 35a adapted to cooperate with a snap fastener element 36 secured to the envelope 25 whereby the flap element 35 may be folded over the handle 34 and secured by cooperation of the snap fastener elements 35a and 36 to hold the handle member 34 in this position. It will be noted that with the handle 34 in the position just referred to the same has to be pulled some distance to the left, having reference to Fig. 3, before effecting actuation of the cables 32 and 33 to release the coupling members 23 and 24. This provides a lost motion relation between the actuating members 32 and 33 and the handle member 34 such that these actuating members 32 and 33 may be moved accidentally a certain distance relative to the handle without effecting the withdrawal of the coupling members 23 and 24. Thus the handle member 34 is prevented from unauthorized actuation which might serve to prematurely release the connection between the harness and the reserve parachute envelope 25.

An additional safety provision for preventing unauthorized release resides in the provision of detent means effecting a locking cooperation between either or both of the fastening elements and the coupling member 23. As shown in Figs. 3 and 4, this detent means may comprise a ball member 40 mounted in a suitable recess provided in the eye element 30 of fastening element 26 and pressed by means of a spring 41 into engagement with an annular groove 42 on the pin member 23 whereby unauthorized release of the pin member 23 is resisted. Such detent means may also be provided in conjunction with fastening element 27 for cooperation with coupling member 24.

It will be understood that in the parachute apparatus of the type illustrated in the drawings, the main parachute inclosed in the main parachute envelope 1 is designed to have a static line connected thereto which is secured to the airplane when the parachutist jumps therefrom so that the main parachute is pulled out of the envelope 1 automatically when the parachutist jumps out of the plane, said main parachute having its shroud lines connected to the lift webs 7a and 8a. It will also be understood that the release of the reserve parachute from the envelope 25 from folded condition inclosed within the envelope 25 is effected by pulling the rip cord handle 37 whenever the necessity for the use of the reserve parachute arises.

In the use of the parachute apparatus of the invention, the harness is disposed in position upon the body of the parachutist with the main parachute pack A against the back of the wearer, the back straps 2 and 3 extending over his shoulders, and the leg straps 15 and 16 extending upwardly between his legs. The free ends of the straps 7 and 15 are now connected to the envelope 25 of the parachute pack C by inserting the pin 23 through the eyes of the fastening elements 9, 19 and 26 so that the detent 40 engages the annular groove 42 to resist withdrawal of the pin 23 from coupling relation with the fastening elements 9, 19 and 26.

Likewise, the free ends of the straps 8 and 16 are connected to the envelope 25 by inserting coupling member 24 through the eyes of the fastening elements 10, 20 and 27. Thus the harness is disposed in proper position upon the wearer's body and the main parachute pack A and the reserve parachute pack C are retained in the desired relation. The flap 35 is then snapped over the handle 34 to maintain the same in position against unauthorized release. When the parachutist reaches the earth after a descent he may quickly unsnap the flap 35, exposing the handle 34, which may then be grasped by the left hand of the parachutist and pulled leftwardly, having reference to Fig. 3, or rightwardly, having reference to Fig. 1, to withdraw the coupling pins 23 and 24 from coupling relation with the fastening elements cooperating therewith. The leftward movement of the pin member 23 moves the detent 40 against the action of the spring 41 to release said detent from engagement with the groove 42.

It will be apparent that, upon withdrawal of the coupling members 23 and 24 from coupling relation with the fastening elements cooperating therewith, the reserve parachute pack C will fall away from the harness and the free ends of the harness will be released from interconnection so that the parachutist may readily disengage himself from the harness.

From the foregoing it will be seen that the invention provides a highly advantageous arrangement of parachute harness in conjunction with a reserve parachute pack and quick release fastening means for connecting the harness to said reserve parachute pack whereby the interconnection serves to maintain the harness disposed in proper position around the body of the wearer, and release of said connection, effected in a rapid manner by a simple manual operation, serves to disconnect the reserve parachute pack from the harness and free the ends of the latter so that the parachutist may quickly disengage himself therefrom.

Referring to Fig. 6, there is illustrated a modification of the invention wherein positive locking means is provided for preventing withdrawal of one of the coupling members. The construction of Fig. 6 is generally similar to Figs. 1 to 5 and wherever the same numerals have been used to designate the same parts, the same will not be further specifically referred to. In Fig. 6 the coupling pin member 23' is provided with a passage extending transversely therethrough which is adapted to receive a safety pin or wire for preventing withdrawal of the coupling member 23' from cooperative relation with the fastening elements 9, 19, and 26. As illustrated, the safety-locking means comprises a pin 45 adapted to be inserted through the passage in the coupling member 23'. The lock pin 45 may be suitably secured to the parachute envelope 25 as by means of cord 46 stitched or otherwise secured to the envelope 25 so that the locking pin 45 will not become lost when it is withdrawn from cooperation with the coupling member 23'. When the locking pin 45 is inserted through the coupling member 23', as illustrated in Fig. 6, it will abut against the exterior of the fastening element 26 and prevent withdrawal of coupling member 23' from cooperative engagement with fastening elements 9, 19, and 26.

It will be noted that, in the arrangement of Fig. 6 utilizing the positive locking means 45, the actuating members or cables 32' and 33' have their abutment members 32a' and 33a' arranged so that the portion 34a of the handle or operating means 34 will first engage the abutment member 32a' when the handle 34 is moved leftwardly, having reference to Fig. 6, and under such condition, the portion 34a of the handle 34 will not engage the abutment 33a' until the coupling member 23' has been moved some distance leftwardly, having reference to Fig. 6, through the actuation of the cable 32' by engagement of the abutment 32a' with the handle 34 as the latter is moved leftwardly having reference to Fig. 6. It will therefore be apparent that the handle 34 cannot engage the abutment 33a' until the locking pin 45 has been withdrawn from locking cooperation with the coupling member 23'. Thus the handle 34 cannot operate to withdraw the coupling member 24 from cooperative relation with the fastening elements 10, 20, and 27 until the locking pin 45 is released from locking cooperation with the coupling member 23'. The relation of the abutment members 32a' and 33a' with respect to the portion 34a of the handle 34 is such that, after the locking pin 45 has been withdrawn, the handle member 34, in moving leftwardly, will move the coupling member 23' leftwardly a certain distance before engagement of the handle 34 with the abutment 33a', but the coupling member 23' will not be moved leftwardly a sufficient distance to withdraw it from coupling cooperation with the fastening elements 9, 19, and 26 prior to engagement of handle member 34 with the abutment member 33a'. Thus, at the time that the handle 34 engages the abutment 33a' in moving leftwardly, the coupling member 23' will have been moved leftwardly a certain distance but will not have been withdrawn from coupling relation with the fastening elements 9, 19, and 26, and hence further movement of the handle member 34 leftwardly with both of the abutment members 32a' and 33a' in engagement therewith will serve to withdraw the coupling members 23' and 24 from coupling relation with their respective fastening elements substantially simultaneously.

Means is provided for interconnecting the fastening elements 26 and 27 on the envelope 25 whereby to prevent said elements from spreading and tearing said envelope. As shown in Fig. 6, the means for interconnecting the fastening elements 26 and 27 may comprise a length of webbing 47, the ends of which extend through suitable openings provided in the fastening elements 26 and 27, said ends of webbing 47 then being stitched back upon the main part of webbing or otherwise secured in any suitable manner.

Having thus described my invention, I claim:

1. In parachute apparatus of the class described, the combination of a harness comprising strap means adapted to be disposed around the body of a parachutist, said strap means having a plurality of free ends, and means for interconnecting the free ends of said strap means to maintain the harness in position disposed around the wearer's body, said last means comprising an envelope for containing a parachute, and means for releasably connecting the free ends of said strap means to said envelope.

2. In parachute apparatus of the class described, the combination of a harness comprising strap means adapted to be disposed around the body of a parachutist, said strap means having a plurality of free ends, and means for interconnecting the free ends of said strap means to maintain the harness in position disposed around the wearer's body, said last means comprising an envelope for containing a parachute, and quick release fastening means for connecting the free ends of said strap means to said envelope.

3. In parachute apparatus of the class described, in combination, a harness comprising strap means having a plurality of free ends, an envelope for containing a parachute, means for connecting the free ends of said strap means to said envelope, and common means for releasing the free ends of said strap means from said envelope.

4. In parachute apparatus of the class described, in combination, a harness including upper body strap means having a free end extending toward the front of the wearer, lower body strap means having a free end extending toward the front of the wearer, an envelope for containing a parachute, means for connecting said ends of said strap means to said envelope, and means for releasing said ends of said strap means from said envelope simultaneously.

5. Parachute apparatus as claimed in claim 2 wherein said fastening means comprises a fastening element secured to said envelope, respective fastening elements secured to respective ends of said strap means, a coupling member cooperable with the fastening element on said envelope and with a plurality of the strap end fastening elements for connecting the latter to said envelope, and means for releasing said fastening member from cooperative relation with said elements.

6. Parachute apparatus as claimed in claim 2 wherein said fastening means comprises a fastening element secured to said envelope, respective fastening elements secured to respective ends of said strap means, a coupling member cooperable with the fastening element on said envelope and with a plurality of the strap end fastening elements for connecting the latter to said envelope, means for releasing said coupling member from cooperative relation with said elements, and detent means operable to resist unauthorized release of said member from cooperative relation with said elements.

7. Parachute apparatus as claimed in claim 2 wherein said fastening means comprises a fastening element secured to said envelope, respective fastening elements secured to respective ends of said strap means, a coupling member cooperable with the fastening element on said envelope and with a plurality of the strap end fastening elements for connecting the latter to said envelope, and means for releasing said coupling member from cooperative relation with said elements, said last means comprising a handle member, an actuating member interconnecting said coupling member and said handle member, said handle member being associated with said actuating member for lost motion relation thereto prior to actuating movement of said actuating member by said handle member.

8. Parachute apparatus as claimed in claim 2 wherein said fastening means comprises a fastening element secured to said envelope, respective fastening elements secured to respective ends of said strap means, a coupling member cooperable with the fastening element on said envelope and with a plurality of the strap end fastening elements for connecting the latter to said envelope, means for releasing said coupling member from cooperative relation with said elements, said last means comprising a handle member, an actuating member interconnecting said coupling member and said handle member, said handle member being associated with said actuating member for lost motion relation thereto prior to actuating movement of said actuating member by said handle member, and means for normally retaining said handle member in non-actuating relation to said actuating member.

9. Parachute apparatus as claimed in claim 2 wherein said fastening means comprises a fastening element secured to said envelope, respective fastening elements secured to respective ends of said strap means, a coupling member cooperable with the fastening element on said envelope and with a plurality of the strap end fastening elements for connecting the latter to said envelope, and means for releasing said coupling member from cooperative relation with said elements, said last means comprising a handle member, an actuating member interconnecting said fastening member and said handle member, said actuating member extending loosely through a portion of said handle member, and abutment means on said actuating member for engagement with said handle member when the latter is moved in one direction relative to said actuating member.

10. Parachute apparatus as claimed in claim 2 wherein the strap means includes a pair of shoulder straps and a pair of leg straps, each of said straps having a fastening element secured to its free end, said fastening means comprising a pair of fastening elements secured to said envelope in spaced relation to one another, and coupling means for connecting the fastening elements of one shoulder strap and of one leg strap to each fastening element on said envelope.

11. Parachute apparatus as claimed in claim 2 wherein the strap means includes a pair of leg straps and a pair of shoulder straps, each of said straps having a respective fastening element secured to its free end, said fastening means comprising a pair of fastening elements secured to said envelope in spaced relation to one another, and coupling means comprising a pair of coupling members, each of said coupling members being cooperable with a respective fastening element on the envelope and with the fastening elements of one shoulder strap and one leg strap for connecting said elements together, a respective actuating member for each coupling member, and means for releasing said coupling members from cooperative relation with said elements, said last means comprising means common to said actuating members to effect actuation thereof simultaneously.

12. In parachute apparatus of the class described, the combination of a harness comprising strap means adapted to be disposed around the body of a parachutist, said strap means having a plurality of free ends, and means for interconnecting the free ends of said strap means to maintain the harness in position disposed around the wearer's body, said last means comprising an envelope for containing a parachute, a respective eye element secured to each of said strap ends, an eye element secured to said envelope, a pin member insertable through the eye element on said envelope and through a plurality of the strap end eye elements for connecting said elements together, and means for withdrawing said pin member from said eye elements.

13. In parachute apparatus of the class described, the combination of a harness comprising strap means having a plurality of free ends adapted to be disposed around the body of a parachutist, and means for interconnecting the free ends of said strap means to maintain the harness in position disposed around the wearer's body, said last means comprising a plurality of individual fastening elements, a common supporting member for said fastening elements, a fastening element carried by each respective free end of the strap means, and a respective coupling member cooperable with a respective fastening element on the supporting member and with a plurality of the strap end fastening elements for interconnecting the same together, and common means for releasing said coupling members from cooperative relation with said elements simultaneously.

14. Parachute apparatus, as claimed in claim 2, wherein said fastening means comprises a fastening element secured to said envelope, respective fastening elements secured to respective ends of said strap means, a coupling member cooperable with the fastening element on said envelope and with a plurality of the strap end fastening elements for connecting the latter to said envelope, means for releasing said coupling member from cooperative relation with said elements, and locking means operable to prevent release of said member from cooperative relation with said elements.

15. Parachute apparatus, as claimed in claim 2, wherein said fastening means comprises a fastening element secured to said envelope, respective fastening elements secured to respective ends of said strap means, a coupling member cooperable with the fastening element on said envelope and with a plurality of the strap end fastening elements for connecting latter to said envelope, means for releasing said coupling member from cooperative relation with said elements, and locking means operable to prevent release of said member from cooperative relation with said elements, said locking means comprising a member cooperable with said coupling member and with one of said fastening elements.

16. Parachute apparatus as claimed in claim 2, wherein the strap means includes a pair of leg straps and a pair of shoulder straps, each of said straps having a respective fastening element secured to its free end, said fastening means comprising a pair of fastening elements secured to said envelope in spaced relation to one another, coupling means comprising a pair of coupling members, each of said coupling members being cooperable with a respective fastening element on the envelope and with the fastening elements of one shoulder strap and one leg strap for connecting said elements together, a respective actuating member for each coupling member, and operating means common to said actuating members for simultaneously releasing said coupling members from cooperative relation with said elements, and locking means cooperable with one of said coupling members for preventing release of said member from cooperative relation with said elements, the actuating member for the other coupling member being so constructed and arranged as to be non-operable by said operating means until said locking means is released from locked condition.

17. Parachute apparatus as claimed in claim 2, wherein the strap means includes a pair of leg straps and a pair of shoulder straps, each of said straps having a respective fastening element secured to its free end, said fastening means comprising a pair of fastening elements secured to said envelope in spaced relation to one another, coupling means comprising a pair of coupling members, each of said coupling members being cooperable with a respective fastening element on the envelope and with the fastening elements of one shoulder strap and one leg strap for connecting said elements together, a respective actuating member for each coupling member, operating means common to said actuating members for simultaneously releasing said coupling members from cooperative relation with said elements, and means interconnecting the fastening elements on said envelope whereby to prevent said elements from spreading and tearing said envelope.

WILLIAM CUNNINGHAM.